United States Patent
Kim et al.

(10) Patent No.: US 9,903,446 B1
(45) Date of Patent: Feb. 27, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Ki Tae Kim, Incheon (KR); Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/372,820

(22) Filed: Dec. 8, 2016

(30) Foreign Application Priority Data

Oct. 11, 2016 (KR) .................. 10-2016-0131441

(51) Int. Cl.
*F16H 3/66* (2006.01)
*F16H 3/62* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ............... F16H 3/66; F16H 2200/0069; F16H 2200/2012; F16H 2200/2097; F16H 2200/2046; F16H 3/62
See application file for complete search history.

(56) References Cited

U.S. PATENT DOCUMENTS

| | | | | |
|---|---|---|---|---|
| 7,695,394 B2* | 4/2010 | Phillips | ..................... | F16H 3/66 475/275 |
| 7,736,261 B2* | 6/2010 | Wittkopp | .................. | F16H 3/66 475/276 |
| 7,794,351 B2* | 9/2010 | Wittkopp | .................. | F16H 3/66 475/275 |
| 7,892,138 B2* | 2/2011 | Phillips | ..................... | F16H 3/66 475/317 |
| 8,047,950 B2* | 11/2011 | Wittkopp | .................. | F16H 3/66 475/276 |
| 8,047,954 B2* | 11/2011 | Phillips | ..................... | F16H 3/66 475/282 |
| 8,382,634 B2* | 2/2013 | Beck | ......................... | F16H 3/66 475/279 |
| 8,414,446 B2* | 4/2013 | Beck | ......................... | F16H 3/66 475/277 |
| 2017/0268603 A1* | 9/2017 | Ji | .............................. | F16H 3/66 |

\* cited by examiner

*Primary Examiner* — Jacob S. Scott
*Assistant Examiner* — Tinh Dang
(74) *Attorney, Agent, or Firm* — Knobbe Martens Olson & Bear LLP

(57) ABSTRACT

A planetary gear train of an automatic transmission for a vehicle is disclosed. The planetary gear train may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements.

10 Claims, 2 Drawing Sheets

FIG. 2

| speed stages | control element | | | | | | gear ratio |
|---|---|---|---|---|---|---|---|
| | C1 | C2 | C3 | C4 | C5 | B1 | |
| D1 | | | ● | | ● | ● | 4.981 |
| D2 | ● | | ● | | | ● | 2.950 |
| D3 | ● | ● | | | | ● | 2.107 |
| D4 | ● | | | | ● | ● | 1.549 |
| D5 | ● | ● | | | ● | | 1.186 |
| D6 | ● | | | ● | ● | | 1.000 |
| D7 | | ● | | ● | | | 0.881 |
| D8 | | ● | | ● | ● | | 0.800 |
| D9 | | ● | ● | ● | | | 0.714 |
| D10 | | ● | ● | | ● | | 0.561 |
| REV | | | | ● | ● | ● | -2.246 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0131441 filed in the Korean Intellectual Property Office on Oct. 11, 2016, the entire contents of which are incorporated herein by reference.

BACKGROUND

(a) Field

The present disclosure relates to an automatic transmission for a vehicle. More particularly, the present disclosure relates to a planetary gear train of an automatic transmission for a vehicle that improves power delivery performance and fuel economy by achieving ten forward speed stages with a minimum number of constituent elements being used and improves silent driving of the vehicle by using operation point positioned at a low engine speed.

(b) Description of the Related Art

Generally, an automatic transmission achieving more speed stages has been developed to enhancing fuel economy and optimizing drivability. Recently, increase of oil price is triggering a hard competition in enhancing fuel consumption of a vehicle.

Therefore, many researches for reducing weight and enhancing fuel economy through downsizing of an engine and for securing drivability and fuel economy through multiple speed stages of automatic transmissions have been developed.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve maximum efficiency with a small number of components may be important in order to increase a fuel economy enhancement effect through the multiple-speeds.

In this aspect, in recent years, 8-speed automatic transmissions tend to be implemented and the research and development of a planetary gear train capable of implementing more speed stages has also been actively conducted.

However, an 8-speed automatic transmission generally includes three to four planetary gear sets and five to seven control elements (frictional elements). In this case, since the length of the automatic transmission increases, mountability may be deteriorated.

Recently, one planetary gear set is disposed above another planetary gear set, but structures of automatic transmissions to which parallel planetary gear sets is applied are very limited.

In another way, dog clutches instead of control elements of wet-type are used. However, shift feel can be deteriorated.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

A planetary gear train of an automatic transmission for a vehicle according to an exemplary embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connected to the first rotation element and connected to a transmission housing; a second shaft connected to the second rotation element and the fourth rotation element and connected to the input shaft; a third shaft connected to the third rotation element; a fourth shaft connected to the fifth rotation element and selectively connectable to the second shaft; a fifth shaft connected to the sixth rotation element and the eighth rotation element; a sixth shaft connected to the seventh rotation element; a seventh shaft connected to the ninth rotation element and the eleventh rotation element and connected to the output shaft; an eighth shaft connected to the tenth rotation element and selectively connectable to the third shaft, the fourth shaft, and the sixth shaft; and a ninth shaft connected to the twelfth rotation element and selectively connectable to the fourth shaft.

The ninth shaft may be selectively connectable to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, second, third, and fourth planetary gear sets may be disposed in a sequence of the first, second, third, and fourth planetary gear sets from an engine side.

The planetary gear train may further include: a first clutch selectively connecting the second shaft to the fourth shaft; a second clutch selectively connecting the third shaft to the eighth shaft; a third clutch selectively connecting the fourth shaft to the eighth shaft; a fourth clutch selectively connecting the fourth shaft to the ninth shaft; a fifth clutch selectively connecting the sixth shaft to the eighth shaft; and a first brake selectively connecting the ninth shaft to the transmission housing.

A planetary gear train of an automatic transmission for a vehicle according to another exemplary embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein the input shaft is connected to the second rotation element, the output shaft is connected to the eleventh rotation element, the first rotation element is connected to a transmission housing, the second rotation element is connected to the fourth rotation element, the sixth rotation element is connected to the eighth rotation element, the ninth rotation element is connected to the eleventh rotation element, the fifth rotation element is selectively connectable to the second rotation element, the tenth rotation element is selectively connectable to the third rotation element, the fifth rotation element, and the seventh rotation element, and the twelfth rotation element is selectively connectable to the fifth rotation element.

The twelfth rotation element may be selectively connectable to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, second, third, and fourth planetary gear sets may be disposed in a sequence of the first, second, third, and fourth planetary gear sets from an engine side.

The planetary gear train may further include: a first clutch selectively connecting the second rotation element to the fifth rotation element; a second clutch selectively connecting the third rotation element to the tenth rotation element; a third clutch selectively connecting the fifth rotation element to the tenth rotation element; a fourth clutch selectively connecting the fifth rotation element to the twelfth rotation element; a fifth clutch selectively connecting the seventh rotation element to the tenth rotation element; and a first brake selectively connecting the twelfth rotation element to the transmission housing.

Other effects obtainable or predictable from the exemplary embodiments of the present disclosure will be explicitly or implicitly described in a DETAILED DESCRIPTION section. That is, various effects predictable from the exemplary embodiments of the present disclosure will be described in the DETAILED DESCRIPTION section.

BRIEF DESCRIPTION OF THE DRAWINGS

FIG. 2 is an operation chart of control elements at each speed stage in the planetary gear train according to an exemplary embodiment of the present disclosure.

DESCRIPTION OF SYMBOLS

Figure 1:
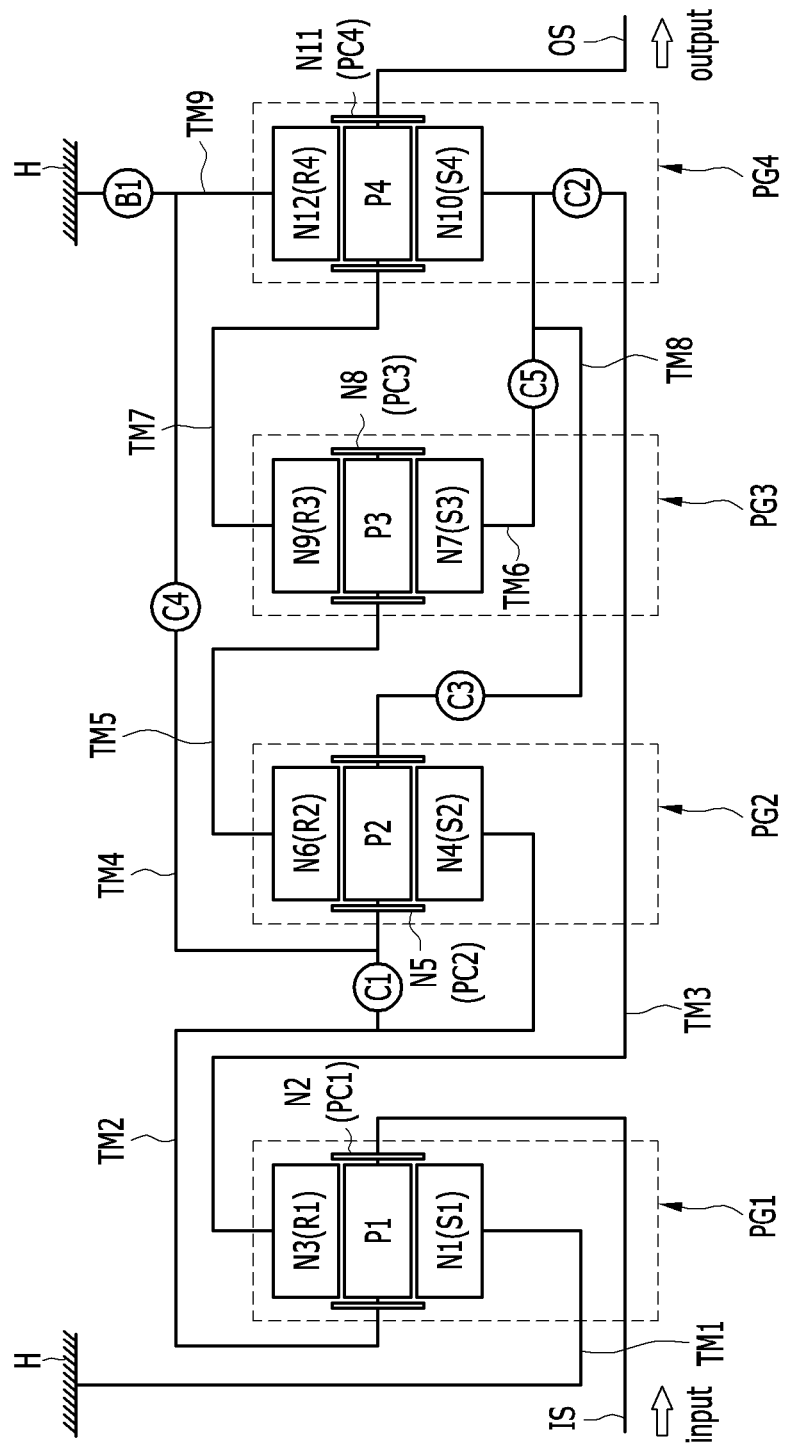
FIG. 1 is a schematic diagram of a planetary gear train according to an exemplary embodiment of the present disclosure.

B1: first brake
C1, C2, C3, C4, C5: first, second, third, fourth, and fifth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers R1, R2, R3, R4: first, second, third, and fourth ring gears
IS: input shaft
OS: output shaft
TM1, TM2, TM3, TM4, TM5, TM6, TM7, TM8, TM9: first, second, third, fourth, fifth, sixth, seventh, eighth, and ninth shafts

DETAILED DESCRIPTION OF THE EMBODIMENTS

Hereinafter, an exemplary embodiment of the present disclosure will be described in detail with reference to the accompanying drawings.

However, parts which are not related with the description are omitted for clearly describing the exemplary embodiments of the present disclosure and like reference numerals refer to like or similar elements throughout the specification.

In the following description, dividing names of components into first, second, and the like is to divide the names because the names of the components are the same as each other and an order thereof is not particularly limited.

The present disclosure has been made in an effort to provide a planetary gear train of an automatic transmission for a vehicle having advantages of improving power delivery performance and fuel economy by achieving at least ten forward speed stages and one reverse speed stage.

Another embodiment of the present disclosure provides a planetary gear train of an automatic transmission for a vehicle having further advantages of improving silent driving of the vehicle by using operation point positioned at a low rotational speed region of an engine.

The planetary gear train according to the exemplary embodiment of the present disclosure may achieve ten forward speed stages and one reverse speed stage by combining four planetary gear sets being simple planetary gear sets with six control elements.

In addition, the planetary gear train according to the exemplary embodiment of the present disclosure may achieve speed stages suitable to a rotational speed of the engine due to multiple-speed stages of the automatic transmission. Particularly, silent driving of the vehicle may be improved by using operation point positioned at a low rotational speed region of an engine.

In addition, the planetary gear train according to the exemplary embodiment of the present disclosure may maximize driving efficiency of the engine and may improve power delivery performance and fuel consumption.

FIG. 1 is a schematic diagram of a planetary gear train according to an exemplary embodiment of the present disclosure.

Referring to FIG. 1, a planetary gear train according to the exemplary embodiment of the present disclosure includes first, second, third, and fourth planetary gear sets PG1, PG2, PG3, and PG4 disposed on the same axis, an input shaft IS, an output shaft OS, nine shafts TM1 to TM9 connected to at least one of rotation elements of the first, second, third, and fourth planetary gear sets PG1, PG2, PG3, and PG4, five clutches C1 to C5 and one brake B1 that are control elements, and a transmission housing H.

Torque input from the input shaft IS is changed by cooperation of the first, second, third, and fourth planetary gear sets PG1, PG2, PG3, and PG4 and the changed torque is output through the output shaft OS.

The planetary gear sets are disposed in the order of the first, second, third, and fourth planetary gear sets PG1, PG2, PG3, and PG4 from an engine side.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The second rotation element N2 is directly connected to the fourth rotation element N4, the sixth rotation element N6 is directly connected to the eighth rotation element N8, and the ninth rotation element N9 is directly connected to the eleventh rotation element N11 such that the first, second, third, and fourth planetary gear sets PG1, PG2, PG3, and PG4 include nine shafts TM1 to TM9.

The nine shafts TM1 to TM9 will be described in further detail.

The nine shafts TM1 to TM9 may be rotation members that directly connect a plurality of rotation elements among the rotation elements of the planetary gear sets PG1, PG2, PG3, and PG4 with each other or that are directly connected to any one rotation element of the planetary gear sets PG1, PG2, PG3, and PG4 and rotate with the any one rotation element to transmit torque, or may be fixed members that selectively or directly connect any one rotation element of the planetary gear sets PG1, PG2, PG3, and PG4 to the transmission housing H to fix the any one rotation element.

The first shaft TM1 is connected to the first rotation element N1 (first sun gear S1) and is directly connected to the transmission housing H so as to be continuously operated as a fixed element.

The second shaft TM2 connects the second rotation element N2 (first planet carrier PC1) to the fourth rotation element N4 (second sun gear S2) and is directly connected to the input shaft IS.

The third shaft TM3 is connected to the third rotation element N3 (first ring gear R1).

The fourth shaft TM4 is connected to the fifth rotation element N5 (second planet carrier PC2) and is selectively connectable to the second shaft TM2.

The fifth shaft TM5 connects the sixth rotation element N6 (second ring gear R2) to the eighth rotation element N8 (third planet carrier PC3).

The sixth shaft TM6 is connected to the seventh rotation element N7 (third sun gear S3).

The seventh shaft TM7 connects the ninth rotation element N9 (third ring gear R3) to the eleventh rotation element N11 (fourth planet carrier PC4) and is directly connected to the output shaft OS so as to be continuously operated as an output element.

The eighth shaft TM8 is connected to the tenth rotation element N10 (fourth sun gear S4) and is selectively connectable to the third shaft TM3, the fourth shaft TM4, and the sixth shaft TM6.

The ninth shaft TM9 is connected to the twelfth rotation element N12 (fourth ring gear R4), is selectively connectable to the fourth shaft TM4, and is selectively connectable to the transmission housing H.

In addition, five clutches C1, C2, C3, C4, and C5 are disposed at portions at which any two shafts among the nine shafts TM1 to TM9 including the input shaft IS and the output shaft OS are selectively connected to each other.

In addition, one brake B1 is disposed at a portion at which any one shaft among the nine shafts TM1 to TM9 is selectively connected to the transmission housing H.

Arrangements of the five clutches C1 to C5 and the one brake B1 are described in detail.

The first clutch C1 is disposed between the second shaft TM2 and the fourth shaft TM4 and selectively connects the second shaft TM2 to the fourth shaft TM4.

The second clutch C2 is disposed between the third shaft TM3 and the eighth shaft TM8 and selectively connects the third shaft TM3 to the eighth shaft TM8.

The third clutch C3 is disposed between the fourth shaft TM4 and the eighth shaft TM8 and selectively connects the fourth shaft TM4 to the eighth shaft TM8.

The fourth clutch C4 is disposed between the fourth shaft TM4 and the ninth shaft TM9 and selectively connects the fourth shaft TM4 to the ninth shaft TM9.

The fifth clutch C5 is disposed between the sixth shaft TM6 and the eighth shaft TM8 and selectively connects the sixth shaft TM6 to the eighth shaft TM8.

The first brake B1 is disposed between the ninth shaft TM9 and the transmission housing H and selectively connects the ninth shaft TM9 to the transmission housing H.

The control elements including the first, the second, the third, the fourth, and the fifth clutches C1, C2, C3, C4, and C5 and the first brake B1 may be frictionally engaging units that are operated by hydraulic pressure. Particularly, the control elements may be, but not limited to, multi-plates friction elements of wet type. However, the control elements may be engaging units that are operated by electrical signal, such as dog clutches, electric clutches, magnetic particle clutches, etc.

FIG. 2 is an operation chart of control elements at each speed stage in the planetary gear train according to an exemplary embodiment of the present disclosure.

As shown in FIG. 2, three control elements among the first, the second, the third, the fourth, and the fifth clutches C1, C2, C3, C4, and C5 and the first brake B1 that are control elements are operated at each speed stage in the planetary gear train according to the exemplary embodiment of the present disclosure.

The third and fifth clutches C3 and C5 and the first brake B1 are simultaneously operated at a first forward speed stage D1.

In a state that the fourth shaft TM4 is connected to the eighth shaft TM8 by operation of the third clutch C3 and the sixth shaft TM6 is connected to the eighth shaft TM8 by operation of the fifth clutch C5, torque of the input shaft IS is input to the second shaft TM2.

In a state that the first shaft TM1 is continuously operated as the fixed element, the ninth shaft TM9 is operated as the fixed element by operation of the first brake B1. Therefore, the torque of the input shaft IS is shifted into the first forward speed stage D1, and the first forward speed stage D1 is output through the output shaft OS connected to the seventh shaft TM7. That is, the operating of the third and fifth clutches C3, C5 results in the torque of the input shaft IS being transferred to the fourth rotation element N4. Accordingly, the planetary gear set PG4 is driven by torque from fifth rotation element N5 which drives the tenth rotation element N10 while the twelfth rotation element N12 is braked by the brake B1. As such, torque is outputted from with the eleventh rotation element N11 to the output shaft OS at a ratio of 4.981:1.

The first and third clutches C1 and C3 and the first brake B1 are simultaneously operated at a second forward speed stage D2.

In a state that the second shaft TM2 is connected to the fourth shaft TM4 by operation of the first clutch C1 and the fourth shaft TM4 is connected to the eighth shaft TM8 by operation of the third clutch C3, the torque of the input shaft IS is input to the second shaft TM2.

In a state that the first shaft TM1 is continuously operated as the fixed element, the ninth shaft TM9 is operated as the fixed element by operation of the first brake B1. Therefore, the torque of the input shaft IS is shifted into the second forward speed stage D2, and the second forward speed stage D2 is output through the output shaft OS connected to the seventh shaft TM7. That is, the operating of the first and third clutches C1 and C3 results in the torque of the input shaft IS being transferred to the tenth rotation element N10. Accordingly, the planetary gear set PG4 is driven by torque from the fifth rotation element N5 which drives the tenth rotation element N10 while the twelfth rotation element N12 is braked by the brake B1. As such, torque is outputted from with the eleventh rotation element N11 to the output shaft OS at a ratio of 2.950:1.

The first and second clutches C1 and C2 and the first brake B1 are simultaneously operated at a third forward speed stage D3.

In a state that the second shaft TM2 is connected to the fourth shaft TM4 by operation of the first clutch C1 and the third shaft TM3 is connected to the eighth shaft TM8 by operation of the second clutch C2, the torque of the input shaft IS is input to the second shaft TM2.

In a state that the first shaft TM1 is continuously operated as the fixed element, the ninth shaft TM9 is operated as the fixed element by operation of the first brake B1. Therefore, the torque of the input shaft IS is shifted into the third forward speed stage D3, and the third forward speed stage D3 is output through the output shaft OS connected to the seventh shaft TM7. That is, the operating of the first and second clutches C1 and C2 results in the torque of the input shaft IS being transferred to the tenth rotation element N10. Accordingly, the planetary gear set PG4 is driven by torque from the third rotation element N3 which drives the tenth rotation element N10 while the twelfth rotation element N12 is braked by the brake B1. As such, torque is outputted from with the eleventh rotation element N11 to the output shaft OS at a ratio of 2.107:1.

The first and fifth clutches C1 and C5 and the first brake B1 are simultaneously operated at a fourth forward speed stage D4.

In a state that the second shaft TM2 is connected to the fourth shaft TM4 by operation of the first clutch C1 and the sixth shaft TM6 is connected to the eighth shaft TM8 by operation of the fifth clutch C5, the torque of the input shaft IS is input to the second shaft TM2.

In a state that the first shaft TM1 is continuously operated as the fixed element, the ninth shaft TM9 is operated as the fixed element by operation of the first brake B1. Therefore, the torque of the input shaft IS is shifted into the fourth forward speed stage D4, and the fourth forward speed stage D4 is output through the output shaft OS connected to the seventh shaft TM7. That is, the operating of the first and fifth clutches C1 and C5 results in the torque of the input shaft IS being transferred to the eighth rotation element N8. Accordingly, the planetary gear sets PG3 and PG4 operate in compound and torque is outputted from with the eleventh rotation element N11 to the output shaft OS at a ratio of 1.549:1.

The first, second, and fifth clutches C1, C2, and C5 are simultaneously operated at a fifth forward speed stage D5.

In a state that the second shaft TM2 is connected to the fourth shaft TM4 by operation of the first clutch C1, the third shaft TM3 is connected to the eighth shaft TM8 by operation of the second clutch C2, and the sixth shaft TM6 is connected to the eighth shaft TM8 by operation of the fifth clutch C5, the torque of the input shaft IS is input to the second shaft TM2.

In addition, the first shaft TM1 is continuously operated as the fixed element. Therefore, the torque of the input shaft IS is shifted into the fifth forward speed stage D5, and the fifth forward speed stage D5 is output through the output shaft OS connected to the seventh shaft TM7. That is, the operating of the first, second and fifth clutches C1, C2 and C5 results in the torque of the input shaft IS being transferred to the eighth rotation element N8. Further, torque from rotation element N3 is transferred to seventh rotation element N7. Accordingly, torque is outputted from with the eleventh rotation element N11 to the output shaft OS at a ratio of 1.186:1.

The first, fourth, and fifth clutches C1, C4, and C5 are simultaneously operated at a sixth forward speed stage D6.

In a state that the second shaft TM2 is connected to the fourth shaft TM4 by operation of the first clutch C1, the fourth shaft TM4 is connected to the ninth shaft TM9 by operation of the fourth clutch C4, and the sixth shaft TM6 is connected to the eighth shaft TM8 by operation of the fifth clutch C5, the torque of the input shaft IS is input to the second shaft TM2 and the fourth shaft TM4.

In this case, the second, third, and fourth planetary gear sets PG2, PG3, and PG4 become lock-up states.

Therefore, the torque of the input shaft IS input to the fourth shaft TM4 is shifted into the sixth forward speed stage D6, and the sixth forward speed stage D6 is output through the output shaft OS connected to the seventh shaft TM7. At the sixth forward speed stage, the same rotation speed as the input shaft IS is output. That is, the operating of the first, fourth and fifth clutches C1, C4 and C5 results in the torque of the input shaft IS being transferred to the eighth rotation element N8 and the twelfth rotation element N12. Accordingly, the planetary gear sets PG3 and PG4 operate in compound and torque is outputted from with the eleventh rotation element N11 to the output shaft OS at a ratio of 1.000:1.

The first, second, and fourth clutches C1, C2, and C4 are simultaneously operated at a seventh forward speed stage D7.

In a state that the second shaft TM2 is connected to the fourth shaft TM4 by operation of the first clutch C1, the third shaft TM3 is connected to the eighth shaft TM8 by operation of the second clutch C2, and the fourth shaft TM4 is connected to the ninth shaft TM9 by operation of the fourth clutch C4, the torque of the input shaft IS is input to the second shaft TM2.

In addition, the first shaft TM1 is continuously operated as the fixed element. Therefore, the torque of the input shaft IS is shifted into the seventh forward speed stage D7, and the seventh forward speed stage D7 is output through the output shaft OS connected to the seventh shaft TM7. That is, the operating of the first, second and fourth clutches C1, C2 and C4 results in the torque of the input shaft IS being transferred to the twelfth rotation element N12. Further, torque from the third rotation element N3 drives tenth rotation element N10. Accordingly, torque is outputted from with the eleventh rotation element N11 to the output shaft OS at a ratio of 0.881:1.

The second, fourth, and fifth clutches C2, C4, and C5 are simultaneously operated at an eighth forward speed stage D8.

In a state that the third shaft TM3 is connected to the eighth shaft TM8 by operation of the second clutch C2, the fourth shaft TM4 is connected to the ninth shaft TM9 by operation of the fourth clutch C4, and the sixth shaft TM6 is connected to the eighth shaft TM8 by operation of the fifth clutch C5, the torque of the input shaft IS is input to the second shaft TM2.

In addition, the first shaft TM1 is continuously operated as the fixed element. Therefore, the torque of the input shaft IS is shifted into the eighth forward speed stage D8, and the eighth forward speed stage D8 is output through the output shaft OS connected to the seventh shaft TM7. That is, the operating of the second, fourth and fifth clutches C2, C4 and C5 results in the torque of the input shaft IS being transferred to the eighth rotation element N8 and the twelfth rotation element N12. Accordingly, the planetary gear sets PG1, PG2, PG3 and PG4 operate in compound and torque is outputted from with the eleventh rotation element N11 to the output shaft OS at a ratio of 0.800:1.

The second, third, and fourth clutches C2, C3, and C4 are simultaneously operated at a ninth forward speed stage D9.

In a state that the third shaft TM3 is connected to the eighth shaft TM8 by operation of the second clutch C2, the fourth shaft TM4 is connected to the eighth shaft TM8 by operation of the third clutch C3, and the fourth shaft TM4 is connected to the ninth shaft TM9 by operation of the fourth clutch C4, the torque of the input shaft IS is input to the second shaft TM2.

In addition, the first shaft TM1 is continuously operated as the fixed element. Therefore, the torque of the input shaft IS is shifted into the ninth forward speed stage D9, and the ninth forward speed stage D9 is output through the output shaft OS connected to the seventh shaft TM7. That is, the operating of the second, third and fourth clutches C2, C3 and C4 results in the torque of the input shaft IS being transferred to the fourth rotation element N4. Also, the third rotation element N3 is connected to the fifth rotation element N5 and the tenth rotation element N10. Accordingly, the planetary gear sets PG1, PG2 and PG4 operate in compound and torque is outputted from with the eleventh rotation element N11 to the output shaft OS at a ratio of 0.714:1.

The second, third, and fifth clutches C2, C3, and C5 are simultaneously operated at a tenth forward speed stage D10.

In a state that the third shaft TM3 is connected to the eighth shaft TM8 by operation of the second clutch C2, the fourth shaft TM4 is connected to the eighth shaft TM8 by operation of the third clutch C3, and the sixth shaft TM6 is connected to the eighth shaft TM8 by operation of the fifth clutch C5, the torque of the input shaft IS is input to the second shaft TM2.

In addition, the first shaft TM1 is continuously operated as the fixed element. Therefore, the torque of the input shaft IS is shifted into the tenth forward speed stage D10, and the tenth forward speed stage D10 is output through the output shaft OS connected to the seventh shaft TM7. That is, the operating of the second, third and fifth clutches C2, C3 and C5 results in the torque of the input shaft IS being transferred to the fourth rotation element N4. Also, the third rotation element N3 is connected to the fifth rotation element N5 and the seventh rotation element N7. Accordingly, the planetary gear sets PG1, PG2 and PG3 operate in compound and torque is outputted from with the ninth rotation element N9 to the output shaft OS at a ratio of 0.561:1.

The fourth and fifth clutches C4 and C5 and the first brake B1 are simultaneously operated at a reverse speed stage REV.

In a state that the fourth shaft TM4 is connected to the ninth shaft TM9 by operation of the fourth clutch C4 and the sixth shaft TM6 is connected to the eighth shaft TM8 by operation of the fifth clutch C5, the torque of the input shaft IS is input to the second shaft TM2.

In a state that the first shaft TM1 is continuously operated as the fixed element, the ninth shaft TM9 is operated as the fixed element by operation of the first brake B1. Therefore, the torque of the input shaft IS is shifted into the reverse speed stage R, and the reverse speed stage R is output through the output shaft OS connected to the seventh shaft TM7 as inverse rotation speed. That is, the operating of the brake B1 and the fourth and fifth clutches C4 and C5 results in the sixth rotation element N6 and the twelfth rotation element N12 being braked. Accordingly, the planetary gear sets PG2, PG3 and PG4 operate in compound and torque is outputted from with the eleventh rotation element N11 to the output shaft OS at a ratio of −2.246:1.

The planetary gear trains according to the exemplary embodiment of the present disclosure may achieve at least ten forward speed stages and one reverse speed stage by combining four planetary gear sets PG1, PG2, PG3, and PG4 with the five clutches C1, C2, C3, C4, and C5 and the one brake B1.

In addition, the planetary gear train according to the exemplary embodiment of the present disclosure may achieve suitable speed stages according to rotation speed of the engine. Particularly, silent driving of the vehicle may be improved by using operation point positioned at a low rotational speed region of the engine.

In addition, the planetary gear train according to the exemplary embodiment of the present disclosure may maximize driving efficiency of the engine and may improve power delivery performance and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle comprising:
an input shaft receiving torque of an engine;
an output shaft outputting torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a first shaft connected to the first rotation element and connected to a transmission housing;
a second shaft connected to the second rotation element and the fourth rotation element and connected to the input shaft;
a third shaft connected to the third rotation element;
a fourth shaft connected to the fifth rotation element and selectively connectable to the second shaft;
a fifth shaft connected to the sixth rotation element and the eighth rotation element;
a sixth shaft connected to the seventh rotation element;
a seventh shaft connected to the ninth rotation element and the eleventh rotation element and connected to the output shaft;
an eighth shaft connected to the tenth rotation element and selectively connectable to the third shaft, the fourth shaft, and the sixth shaft; and
a ninth shaft connected to the twelfth rotation element and selectively connectable to the fourth shaft.

2. The planetary gear train of claim 1, wherein the ninth shaft is selectively connectable to the transmission housing.

3. The planetary gear train of claim 1, wherein the first, second, and third rotation elements of the first planetary gear set are a first sun gear, a first planet carrier, and a first ring gear,
the fourth, fifth, and sixth rotation elements of the second planetary gear set are a second sun gear, a second planet carrier, and a second ring gear,
the seventh, eighth, and ninth rotation elements of the third planetary gear set are a third sun gear, a third planet carrier, and a third ring gear, and
the tenth, eleventh, and twelfth rotation elements of the fourth planetary gear set are a fourth sun gear, a fourth planet carrier, and a fourth ring gear, respectively.

4. The planetary gear train of claim 1, wherein the first, second, third, and fourth planetary gear sets are disposed in a sequence of the first, second, third, and fourth planetary gear sets from an engine side.

5. The planetary gear train of claim 2, further comprising:
a first clutch selectively connecting the second shaft to the fourth shaft;
a second clutch selectively connecting the third shaft to the eighth shaft;
a third clutch selectively connecting the fourth shaft to the eighth shaft;
a fourth clutch selectively connecting the fourth shaft to the ninth shaft;
a fifth clutch selectively connecting the sixth shaft to the eighth shaft; and
a first brake selectively connecting the ninth shaft to the transmission housing.

6. A planetary gear train of an automatic transmission for a vehicle comprising:
an input shaft receiving torque of an engine;
an output shaft outputting torque;
a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the input shaft is connected to the second rotation element,
the output shaft is connected to the eleventh rotation element,
the first rotation element is connected to a transmission housing,
the second rotation element is connected to the fourth rotation element,
the sixth rotation element is connected to the eighth rotation element,
the ninth rotation element is connected to the eleventh rotation element,
the fifth rotation element is selectively connectable to the second rotation element,
the tenth rotation element is selectively connectable to the third rotation element, the fifth rotation element, and the seventh rotation element, and
the twelfth rotation element is selectively connectable to the fifth rotation element.

7. The planetary gear train of claim 6, wherein the twelfth rotation element is selectively connectable to the transmission housing.

8. The planetary gear train of claim 6, wherein the first, second, and third rotation elements of the first planetary gear set are a first sun gear, a first planet carrier, and a first ring gear,
the fourth, fifth, and sixth rotation elements of the second planetary gear set are a second sun gear, a second planet carrier, and a second ring gear,
the seventh, eighth, and ninth rotation elements of the third planetary gear set are a third sun gear, a third planet carrier, and a third ring gear, and
the tenth, eleventh, and twelfth rotation elements of the fourth planetary gear set are a fourth sun gear, a fourth planet carrier, and a fourth ring gear, respectively.

9. The planetary gear train of claim 6, wherein the first, second, third, and fourth planetary gear sets are disposed in a sequence of the first, second, third, and fourth planetary gear sets from an engine side.

10. The planetary gear train of claim 7, further comprising:
a first clutch selectively connecting the second rotation element to the fifth rotation element;
a second clutch selectively connecting the third rotation element to the tenth rotation element;
a third clutch selectively connecting the fifth rotation element to the tenth rotation element;
a fourth clutch selectively connecting the fifth rotation element to the twelfth rotation element;
a fifth clutch selectively connecting the seventh rotation element to the tenth rotation element; and
a first brake selectively connecting the twelfth rotation element to the transmission housing.

* * * * *